United States Patent
Lumpe et al.

(10) Patent No.: US 6,676,203 B2
(45) Date of Patent: Jan. 13, 2004

(54) VEHICLE ROOF

(75) Inventors: Karl-Heinz Lumpe, Sprockhövel (DE); Michael Ross, Bocum (DE); Klaus Kolodzeij, Wuppertal (DE)

(73) Assignee: JAC Products Deutschland GmbH, Wuppertal (DE)

( * ) Notice: Subject to any disclaimer, the term of this patent is extended or adjusted under 35 U.S.C. 154(b) by 0 days.

(21) Appl. No.: 10/067,092

(22) Filed: Feb. 4, 2002

(65) Prior Publication Data

US 2003/0020302 A1 Jan. 30, 2003

(51) Int. Cl.[7] .............................................. B62D 25/06
(52) U.S. Cl. ........................ 296/210; 296/214; 296/3
(58) Field of Search ............................ 296/3, 210, 214

(56) References Cited

U.S. PATENT DOCUMENTS 6,318,797 B1 * 11/2001 Bohm et al. ................ 296/210

FOREIGN PATENT DOCUMENTS

| DE | 3810268 A1 | 10/1988 | |
| DE | 19542109 | 5/1996 | |
| DE | 19638156 | 2/1999 | |
| DE | 19746165 A1 | 4/1999 | |
| DE | 19853820 A1 | 5/2000 | |
| DE | 19915546 A1 | 10/2000 | |
| DE | 19709016 | 4/2002 | |
| FR | 2529844 A1 * | 1/1984 | 296/210 |
| GB | 2084941 A * | 4/1982 | |
| JP | 8225045 | 9/1996 | |

* cited by examiner

*Primary Examiner*—Stephen T. Gordon
*Assistant Examiner*—Jason Morrow
(74) *Attorney, Agent, or Firm*—Harness Dickey & Pierce P.L.C.

(57) ABSTRACT

Described is a vehicle roof for a passenger car or the like with a roof panel (1), whose longitudinal edges (2) can each be fastened to a frame side rail (3) of the roof frame of the vehicle body. On this vehicle roof it is provided according to invention, that the roof panel (1), on the longitudinal edge of each side, carries a leg (4) of an angle sheet (5) in a permanent fitting arrangement for additional support and for a fastening arrangement onto the frame side rails (3) of the roof frame and that its respective other leg (6) can be fastened to one of the frame side rails (3).

15 Claims, 2 Drawing Sheets

VEHICLE ROOF

FIELD OF THE INVENTION

Described is a vehicle roof for a passenger car such as limousine, station wagon, van, or minibus with a roof panel, whose longitudinal edges can each be fastened to a frame side rail of the vehicle body's roof frame.

BACKGROUND OF THE INVENTION

When constructing a vehicle body, weld joints are conventionally provided between the vehicle roof and roof frame. Such weld joints are currently being replaced with glued joints to a growing extent. This involves certain difficulties, such as when the adhesive bond is subjected to vibrations while the adhesive being used is hardening, which will prevent the body from being moved on the assembly if long hardening and assembly times are used.

SUMMARY OF THE INVENTION

It is the objective of the present invention to simplify the fastening of a vehicle roof to the frame side rails of a roof frame, thereby stiffening the roof panel, and to take care at minimum expense that the roof panel will already be tightly bonded to the frame side rails of the roof frame after gluing while the adhesive used Is still in its hardening phase.

To solve this task it is provided according to invention that the roof panel, on the longitudinal edge of each side, carries a leg of at least one angle sheet in a permanent fitting arrangement for additional support and for a fastening arrangement onto the frame side rails of the roof frame and that its respective other leg can be fastened to one of the frame side rails, at least in the region of the A, B, C, and D pillar, whereby the longitudinal edge regions of the roof panel demonstrate openings, which are closeable by means of stoppers and the like and which also pass through the legs of the angle sheets abutting the roof panel and which serve for inserting the fastening bolts of roof rails, roof load crossmembers or the like, whereby threaded inserts, weld nuts or insert nuts for the screwed fastening bolts are arranged in the region of the openings of the legs of the angle sheets that abut the roof panel The roof panel is thus from the start designed for the fastening retention of roof rails for instance, and designed thusly in regions that enable the roof load to be introduced into and through the angle sheet into the frame side rails of the roof frame.

The invention according basically consists of providing, for a vehicle roof, a roof panel with angle sheets integrated thereon whose open legs are to be fastened to the frame side rails, and specifically also for forming a glued joint between the roof panel and the frame side rails of the roof frame. Two angle sheets basically extending across the entire length of the roof panel can be provided. Preferably short angle sheets are provided only in the regions of the A, B and C-pillar and, if any, D-pillar. The special advantage of this measure according to invention is that, after the roof panel has been glued with the frame side rails in the regions of the A, B, C and D-pillars or even glued to the vehicle body's entire roof frame, the angle sheets tightly connect the roof panel to the roof fame so that the adhesive bond between the roof panel and roof frame can't be impaired while the adhesive employed is hardening, even when the body is shaken during transport on the assembly line. Another special advantage of the invention consists of, that a roof load isn't introduced into the roof panel, but that the angle sheets introduce it into the roof frame, which is more stabile, and into the body's A, B, C, and D pillars in particular.

BRIEF DESCRIPTION OF THE DRAWINGS

The invention will now be explained in more detail based on the drawing. It shows.

DETAILED DESCRIPTION OF THE PREFERRED EMBODIMENTS

Figure 1:
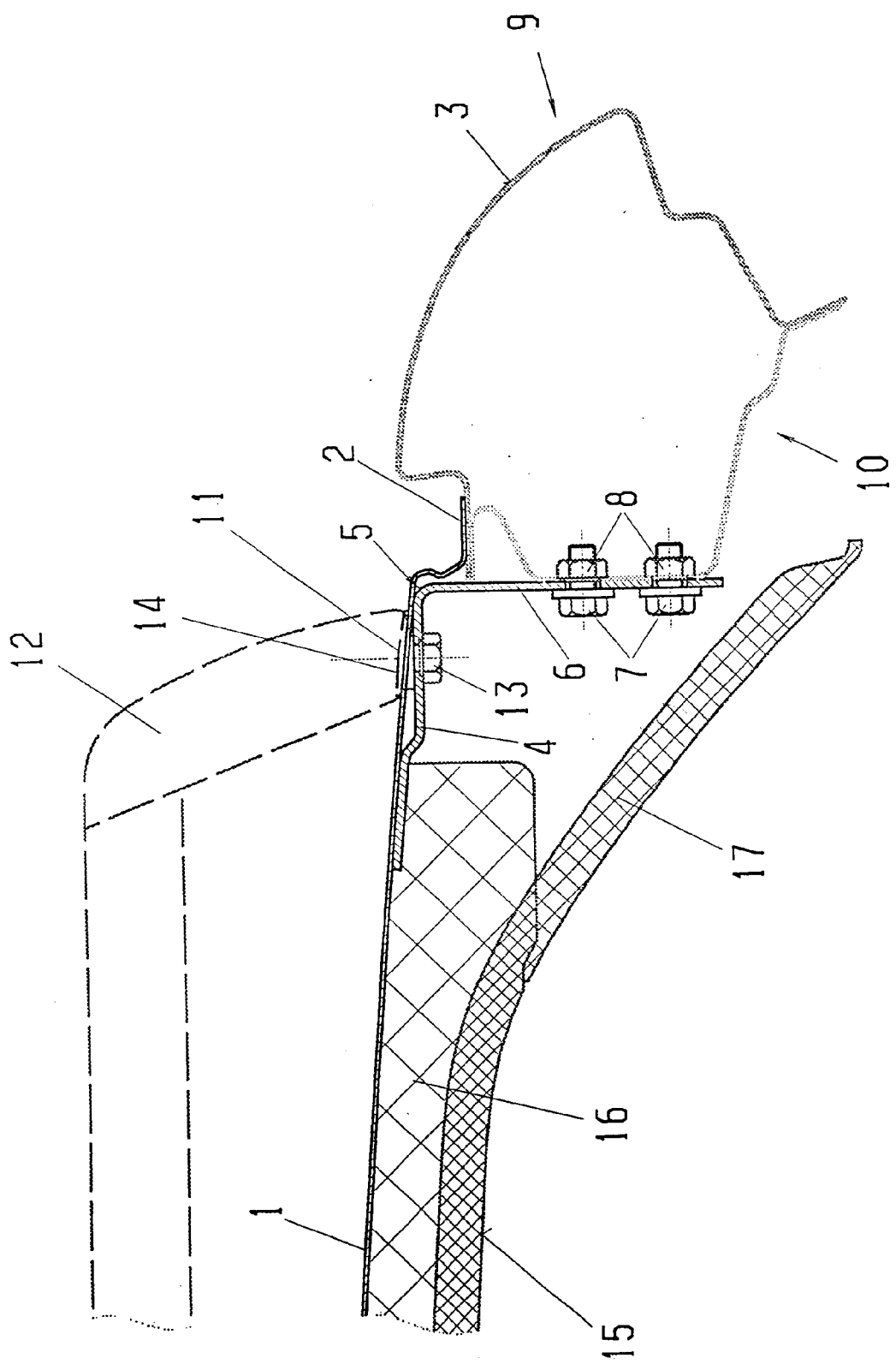
FIG. 1 a first example

FIG. 1 shows, in a longitudinal section, the side of a longitudinal edge region of a vehicle in the region of the roof and it permits the roof panel 1 of a vehicle roof to be recognized. The other longitudinal edge region, which isn't illustrated, is designed as the mirror image of that shown. The roof panel 1 is set off step-like at the longitudinal edge regions and is supported by longitudinal edges 2, each located on a trame side rail 3 of a roof frame that isn't illustrated in detail. A glued joint preferably exists between the longitudinal edges 2 of the roof panel 1 and the frame side rails 3, of which only one is illustrated.

On the side of each longitudinal edge, the roof panel 1 carries in permanent arrangement a leg 4 of at least one angle sheet 5 for additional support and fastening arrangement to the frame side rails 3. The legs 4 of the angle sheets 5 are preferably glued to the roof panel 1. The respective other legs 6 of the angle sheets 5 are fastened to one of the frame side rails 3 and preferably by screw connections, as illustrated. For this, the legs 6 of the sheet angles 5 and the frame side rails 3 demonstrate openings that align with each other for inserting threaded bolts 7 and extruded holes or weld nuts or insert nuts 8 are provided on the frame side rails 3. The frame side rails 3 can each consist of an external side-panel frame component 9 and a reinforcing or internal side-panel frame component 10 bearing the insert nuts 8.

The angle sheets 5 can extend across basically the entire length of the roof panel 1. But they can also be provided only in the region of the A, B, and C-pillars, and, if any D-pillar, and can only be screwed with them there.

The longitudinal edge regions of the roof panel 1 demonstrate openings 11, which also pass through the legs 4 of the angle sheets 5 abutting the roof panel 1 and which serve for inserting the fastening bolts (not illustrated) of roof rails, roof load crossmembers 12 (indicated by dashed lines) or the like. Threaded inserts, weld nuts or insert nuts 13 for the fastening bolts are provided in the region of the openings of the legs 4 of the angle sheets 5 that abut the roof panel 1, As can be deduced from the drawing, the angle sheets 5 introduce the roof load into the frame side rails 3, so that the roof panel 1 basically remains unloaded. When the roof rail or roof load crossmembers 12 are not in use, the openings 11 can be closed in the most simple manner using a stopper 14 indicated by dashed lines.

The vehicle roof additionally features the peculiarity that the roof panel 1, together with the angle sheets 5 arranged thereon and together with a roofliner 15 fastened to the roof panel 1, form a prefabricated assembly unit, which is to be installed on the vehicle body as a roof module as shown. The roof module consists of the roof panel 1, the angle sheets 5, the roofliner 15 and an intermediate layer 16 between roof panel 1 and roofliner 15. The roof module consequently demonstrates a sandwich construction wherein the intermediate layer 16 consists of plastic foam for example. Glued joints can be provided between roof panel 1 and intermediate layer 16 on one side, as well as between the intermediate layer 16 and the roof liner 15 on the other side, wherein both physically-binding and chemically-binding adhesives can be used. A roof frame or pillar lining 17 can be attached to the roof lining 15.

Although not presented in detail, the roof module may feature one or more add-on pieces in pre-assembled arrangement. Roofliner covering, interior trim paneling, sun visors, interior lighting devices, supporting straps, etc. constitute examples.

Figure 2:
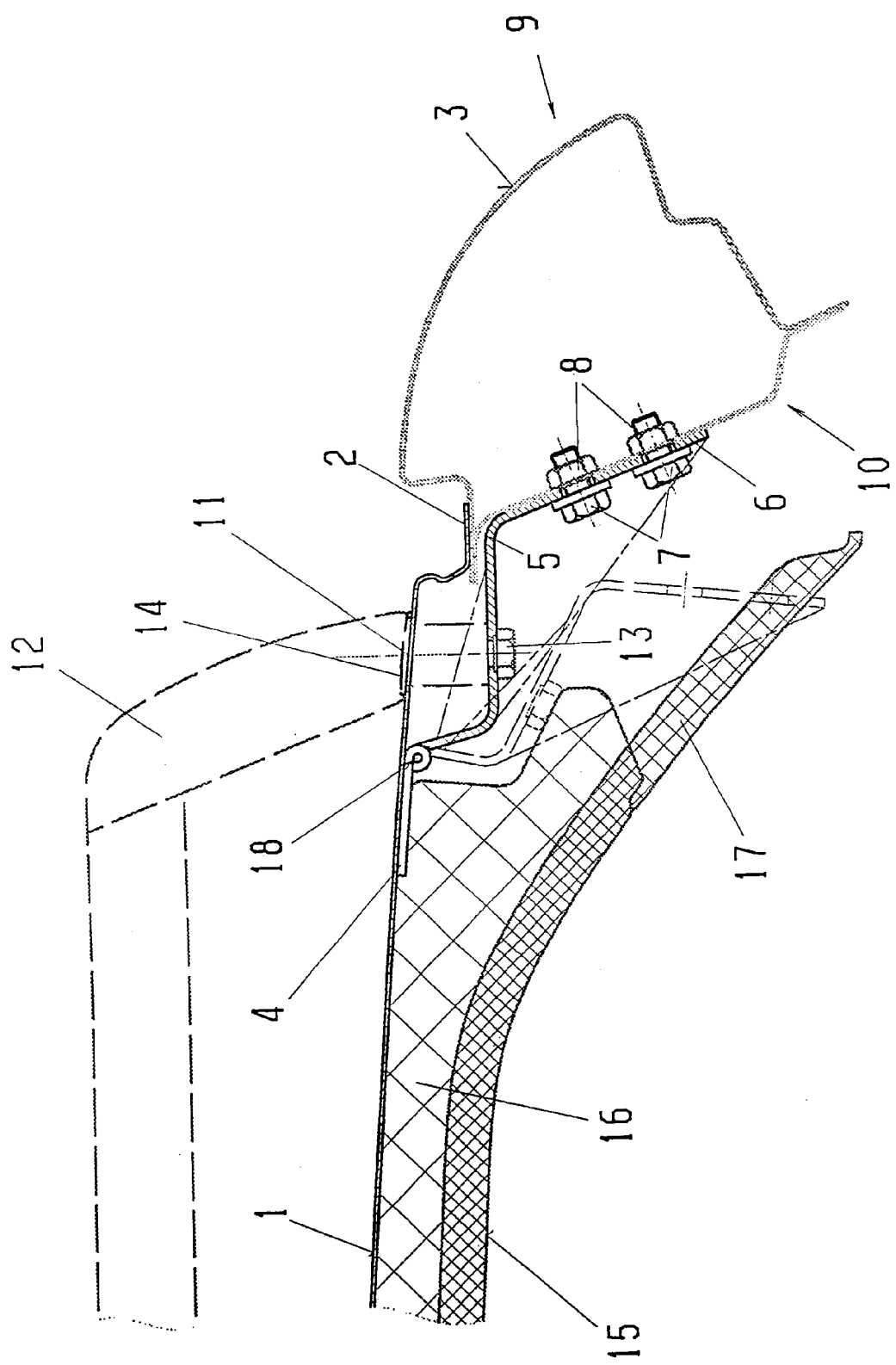
FIG. 2 a second example of a vehicle roof according to invention.

The example of the invention depicted in FIG. 2 basically corresponds to that of FIG. 1 so that matching reference characters are used. The only difference, although basic, consists of the fact that an articulation 18 connect the legs 4 and 6 of the angle sheets 5 to each other hinge-like. The vehicle roof can thereby be assembled from above even under difficult construction situations, as shown in FIG. 2.

An embodiment of the invention put into practice consists of, that the legs of the angle sheets fastened to the frame side rails can be fastened to the frame side rails by screw connections, and that the cited legs of the angle sheets and the frame side rails feature openings that align with each other for inserting threaded bolts, and that the frame side rails feature extruded holes, weld nuts, or insert nuts for screwing in the threaded bolts.

When there are narrow structural relationships, it can be advantageously be provided according to a further development of the invention for the purpose of easier assembly of the vehicle roof, that an articulation connects the legs of the angle sheets to each other hinge-like.

To take into account an effort of car manufacturers to make more extensive use of modular components in the future, another further development of the invention consists of that the roof panel, together with the angle sheets arranged theron and together with a roofliner fastened to the roof panel, form a prefabricated assembly unit. Here the roofliner may be fitted with a roofliner covering, and/or interior trim paneling, sun visors, inside rearview mirror, interior lighting devices, cabling, control and display units, sliding roof or sunroof and its framework and driving elements, supporting straps, etc.

What is claimed is:

1. A vehicle roof assembly, comprising:
   a roof panel having longitudinal edges, each of which define a step;
   angled brackets running along at least a portion of each of said longitudinal edges, said angled brackets having first and second legs, said roof panel being fixedly attached to said first leg;
   frame rails running along at least a portion of each of said longitudinal edges;
   said second leg of each of said angled brackets being fixedly attached to said frame rails; wherein said steps abut said frame rails; and said first and second legs of said angled bracket are in hinged engagement with one another.

2. The vehicle roof assembly of claim 1, further comprising a plurality of roof load cross members selectively attachable to said roof panel and said first leg.

3. The vehicle roof assembly of claim 2, wherein said roof load cross members each include a bolt; wherein said roof panel includes a plurality of openings; wherein each said first leg includes a leg opening; and wherein said bolt runs through said openings of each of said roof panel and said first leg to thereby secure said first leg to said roof panel.

4. The vehicle roof assembly of claim 1, wherein said steps are glued to said frame rails.

5. The vehicle roof assembly of claim 1, further comprising:
   a stopper; and
   aligned openings formed through said roof panel and said first leg, said opening being selectively plugged with said stopper.

6. The vehicle roof assembly of claim 1, wherein said second legs are bolted to said frame rails.

7. The vehicle roof assembly of claim 1, further comprising a roof liner attached to a bottom surface of said roof panel.

8. The vehicle roof assembly of claim 7, further comprising an intermediate layer of plastic foam disposed between said roof liner and said roof panel.

9. A prefabricated vehicle roof unit, comprising:
   a vehicle roof assembly including a roof panel having longitudinal edges, each of which define a step;
   at least one angled bracket running along at least a portion of each of said longitudinal edges, and having first and second legs, said roof panel being fixedly attached to said first leg;
   a roof liner attached to a bottom surface of said roof panel; and a hinge member interconnecting said first and second legs, enabling said first and second legs to pivot relative to one another.

10. The prefabricated vehicle roof unit of claim 9, further comprising an intermediate layer disposed between said roof liner and said roof panel.

11. The prefabricated vehicle roof unit of claim 9, wherein said second leg of each of said angled brackets is fixedly attached to frame rails running along at least a portion of each of said longitudinal edges.

12. The prefabricated vehicle roof unit of claim 11, wherein said steps abut said frame rails.

13. The prefabricated vehicle roof unit of claim 12, wherein said steps are glued to said frame rails.

14. The prefabricated vehicle roof unit of claim 9, further comprising roof load cross members selectively attachable to said roof panel and said first leg.

15. A vehicle roof assembly, comprising:
   a roof panel having longitudinal edges, each of which define a step;
   angled brackets running along at least a portion of each of said longitudinal edges, said angled brackets having a first leg supporting said roof panel, and a second leg, wherein said first and second legs of said angled bracket are in hinged engagement with one another;
   frame rails running along at least a portion of each of said longitudinal edges abutting said frame rails, and being fixedly attached to said second leg; and at least one roof load cross member selectively attachable to said roof panel and said first leg.

* * * * *